July 24, 1962 — W. O. McFARLAND — 3,046,476
CONTINUITY TESTER
Filed Aug. 7, 1957 — 2 Sheets-Sheet 1
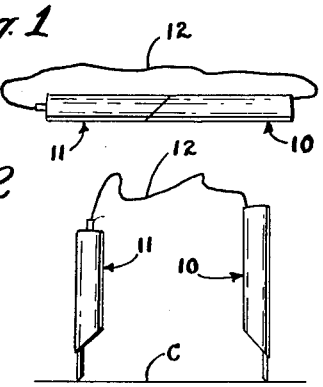
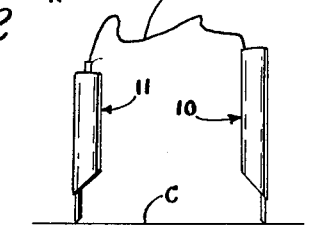
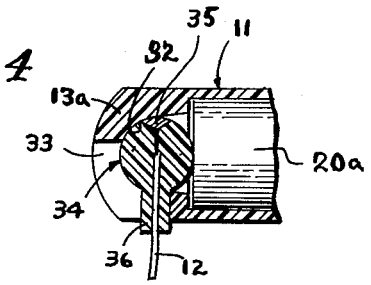
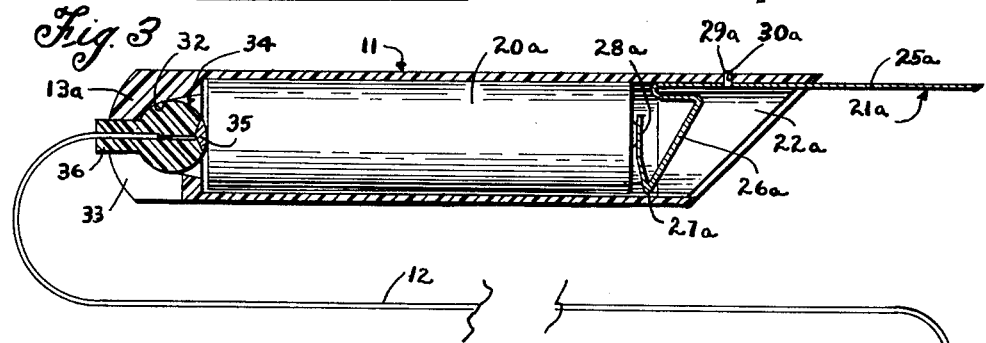
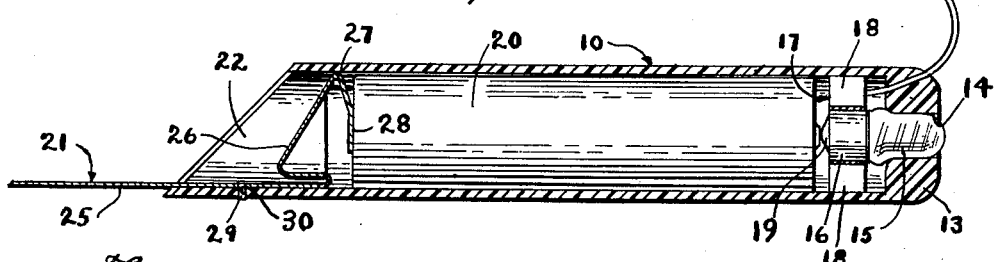
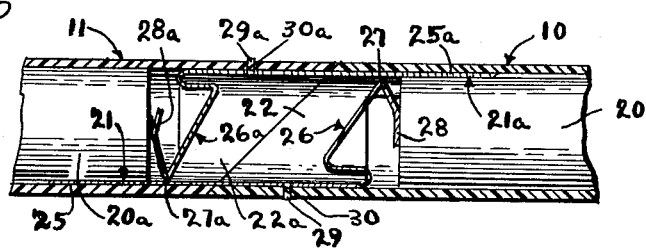
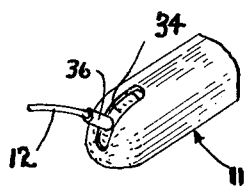
INVENTOR.
William O. McFarland
BY Michael Williams
Attorney

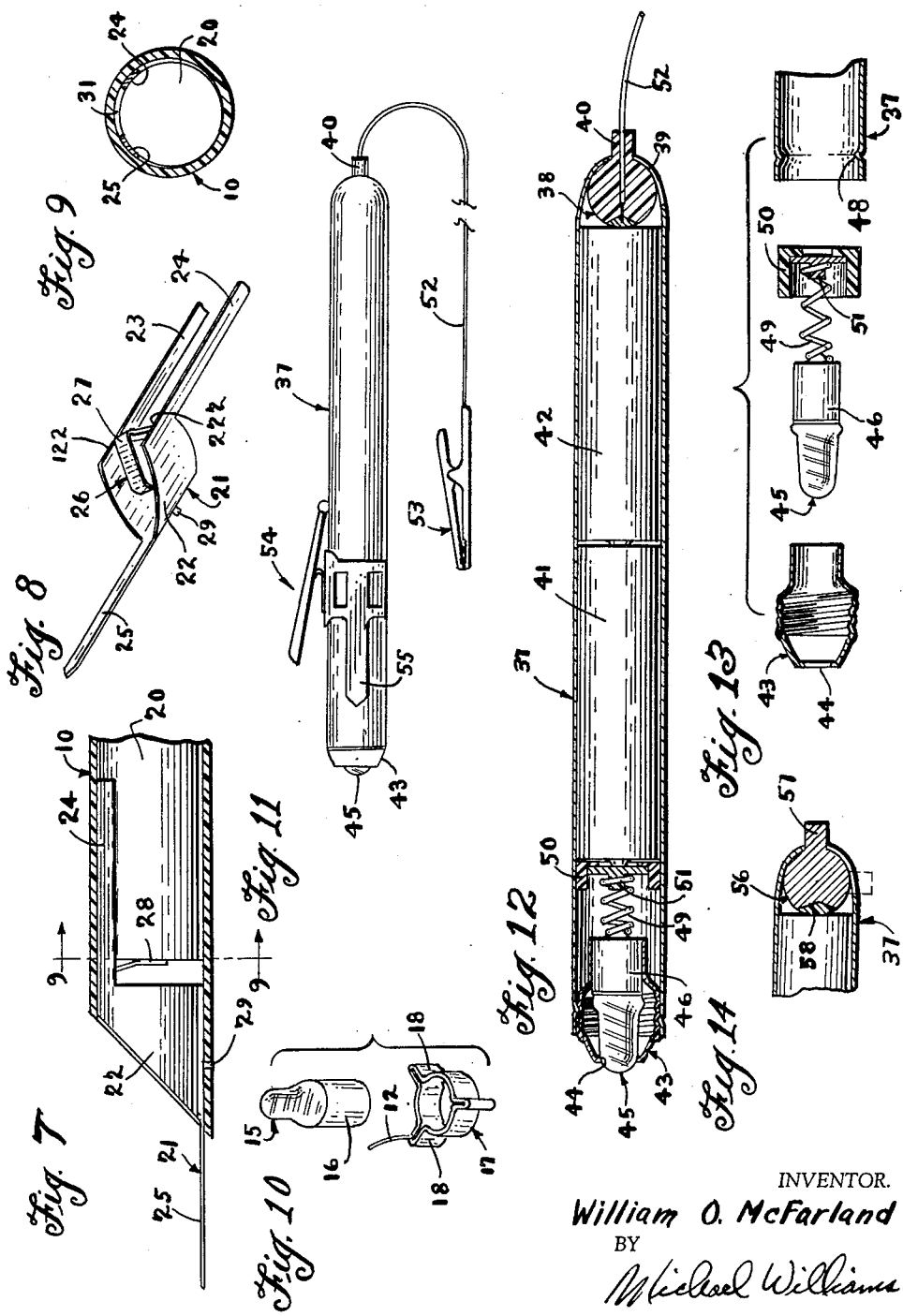

United States Patent Office 3,046,476
Patented July 24, 1962

3,046,476
CONTINUITY TESTER
William O. McFarland, 523 Ravenna Road,
Newton Falls, Ohio
Filed Aug. 7, 1957, Ser. No. 676,887
5 Claims. (Cl. 324—53)

The present invention relates to an electrical device, more particularly to a self-contained, pocket-type electrical circuit continuity tester which also may be used as a pocket flashlight, and the principal object of the invention is to provide new and improved electrical devices of such character.

Electrical circuit continuity testers are, of course, broadly old; however, the present invention provides a self-contained, portable tester which may be carried in a pocket with the ease of a pencil, ready for instant use. It may also be used with equal facility, as a small pocket flashlight. Moreover, the present invention may readily be manufactured and sold at low cost thus creating a market not only among service personnel who have daily need of a tester of this type but also among persons who have only occasional use of a tester. Other advantages will readily become appartnt from a study of the following description and from the drawings attached hereto.

In the drawings accompanying this specification and forming a part of this application there is shown, for purpose of illustration, embodiments which the invention may assume, and in these drawings:

FIGURE 1 is an elevational view of a device constructed in accordance with a preferred embodiment of the present invention and shown in relation wherein the device is arranged for use as a flashlight or for disposition in a pocket or the like for carrying purposes, FIGURE 2 is a view showing the device in relation wherein it is arranged for use in testing the continuity of an electrical circuit, FIGURE 3 is an enlarged, longitudinal sectional view of the device illustrated in FIGURES 1 and 2 and showing certain parts separated as seen in FIGURE 2, FIGURE 4 is a fragmentary sectional view of but a portion of the structure shown in FIGURE 3 and showing certain parts in a different position, FIGURE 5 is a reduced size, fragmentary perspective view of a detail, FIGURE 6 is a fragmentary view similar to FIGURE 3 but with certain parts assembled as shown in FIGURE 1, FIGURE 7 is a fragmentary view of certain parts seen in FIGURE 3 but showing one of the parts in elevation instead of in section, FIGURE 8 is an enlarged perspective view of a detail, FIGURE 9 is a transvesse sectional view generally corresponding to the line 9—9 of FIGURE 7, FIGURE 10 is an exploded perspective view of certain details, FIGURE 11 is a reduced size elevational view of another embodiment of the invention, FIGURE 12 is a fragmentary, enlarged longitudinal sectional view of the embodiment shown in FIGURE 11, FIGURE 13 is an exploted sectional view of certain parts seen in FIGURE 12, and FIGURE 14 is a fragmentary longitudinal sectional view of still another embodiment of the invention.

Briefly, the embodiment of the invention shown in FIGURES 1 through 10 provides an electrical device which functions not only as a pocket-type, self-contained continuity tester for electrical circuits but also as a pocket flashlight. As best seen in FIGURE 3, the device is therein shown to comprise a pair of members 10 and 11, connected by a flexible lead 12, which may be assembled in end to end relation (set FIGURE 1) when it is to be used as a flashlight or is to be carried in a pocket or placed in a tool box or the like, and which may be separated (see FIGURE 2) when the device is to be used as a continuity tester.

Referring to FIGURE 3, member 10 is preferably a hollow cylinder having one end open and the other end partially closed by an integral wall 13. Formed in wall 13 is a central aperture 14 in which the glass end of a conventional penlight bulb 15 seats. Base 16 of the bulb frictionally fits within a collar 17, see also FIGURE 10, having radially outwardly extending ears 18 (herein shown to be three in number) which slideably fit within member 10 and thus maintain the bulb 15 in position centrally of the member. Electrically connected to collar 17 and extending outwardly of member 10 through a suitable aperture in wall 13 is one end of the aforementioned flexible lead 12.

Member 10 is preferably formed of a suitable dielectric material such as plastic; however, it will readily be understood that this member may, if desired, be formed of other material such as metal tubing. Disposed within member 10 and in engagement with a central contact 19 provided by the base 16 of the bulb, is a dry cell battery 20, preferably of the penlight type. In the present embodiment, it is preferable that the inside diameter of member 10 be slightly larger than the outside diameter of battery 20 for a purpose to be seen. For a purpose to be disclosed, the open end of member 10 preferably terminates in a plane which lies at an angle to the member's longitudinal axis and as herein shown, such plane lies at about a forty-five degree angle.

Removably disposed within the open end of member 10 is a member 21 which closes such open end and prevents escape of battery 20, which exerts a resilient force urging the battery to engagemtnt with the bulb, and which provides a probe for a purpose to appear. As best shown in FIGURE 8 but as may also be seen in FIGURE 7, member 21 is preferably formed of resilient sheet metal or the like and comprises an arcuate body portion 22 which is proportioned to closely fit within the open end of member 10. Body portion 22 is somewhat less than annular to provide portions 122, 222 which are spaced-apart for a purpose to be seen. Formed structurally integrally with body portions 122, 222 are respective legs 23, 24 which extend in side by side relation axially of the body portion. Also formed structurally integrally with body portion 22 is a prong 25 which, as shown in the drawings, extends axially of body portion 22 but in the opposite direction from legs 23, 24 and from an opposite part of the body portion.

A structurally integral tongue 26 extends transversely of body portion 22 and has a part 27 disposed adjacent body parts 122, 222 and a part 28 which engages the battery. Extending radially outwardly of body portion 22 is an abutment 29 which fits within an aperture 30 formed in the wall of member 10. Abutment 29 may be provided in any suitable manner and by way of illustration, it may be provided by pressing a tab out of the body portion or, as illustrated, by welding, riveting or otherwise attaching a short pin thereto. Note that the end of body portion 22 adjacent the open end of the member 10 lies at generally the same angle as this end of the member.

With the parts assembled as shown in FIGURES 3 and 7, it will be seen that legs 23, 24 fit between the battery and member 10 to thus hold the battery away from this portion of the inner wall of member 10 to provide a space 31 therebetween (see FIGURE 9) for a purpose to appear. Part 28 of member 21 will resiliently urge the battery to engagement with the bulb and member 21 will be held in position within member 10 by virtue of pin 29 being seated in aperture 30. As will be apparent, member 21 may readily be sprung from its position within member 10 to permit replacement of the battery or the bulb.

With reference to FIGURE 3, member 11 is similar to member 10 with the exception that its wall 13a is formed to provide a socket 32 and this wall has a slot 33 formed therein (see FIGURE 5). Seated in socket 32 is a ball-like member 34 which, in the present embodiment, is formed of plastic or other dielectric material with the exception of a small segment 35 formed of electrically conductive material. Ball 34 is herein shown with a structurally integral boss 36 which provides an operating handle. Extending through boss 36 and electrically connected with conductive segment 35 is the opposite end of the hereinabove mentioned flexible lead 12.

Closing the open end of member 11 is a member 21a which is similar in all respects to member 21 and which therefore is identified with the same reference characters but with the suffix "a" added.

Referring once again to ball 34, it will be seen that its boss 36 extends through slot 33 formed in the closed end of member 11. By means of boss 36, ball 34 may be shifted from the position shown in FIGURE 3 wherein ball segment 35 is engaged with battery 20a to the position shown in FIGURE 4 wherein this segment is out of engagement with the battery. As will readily appear, ball 34 thus provides a switch for the electrical circuit of the device, which circuit includes batteries 20, 20a, members 21, 21a, bulb 15 and flexible lead 12.

With members 10, 11 separated as shown in FIGURE 3 and with ball 34 positioned as shown therein, the device may be used to test the continuity of an electrical circuit, such as the circuit shown at C in FIGURE 2, by touching prongs 25, 25a of the device to respective parts of circuit C. Unless circuit C is open, the electrical circuit of the device will be completed. This will light bulb 15 and give visual indication of the electrical continuity of circuit C.

When the device is not in use as a tester, members 10, 11 are adapted to be placed in end to end abutting relation (see FIGURE 1) with prong 25a disposed in the space 31 (see FIGURE 9) provided between battery 20 and the wall of member 10 and with prong 25 disposed in the corresponding space provided between battery 20a and the wall of member 11. With the prongs thus enclosed, the device may readily be carried in a pocket without danger of injury from the prongs which are generally pointed so as to readily pierce the insulated coverings of circuits to be tested.

As seen in FIGURE 6, it will be noted that members 10, 11 will be frictionally held in assembled relation since part 27 of tongue 26 will resiliently clamp prong 25a against the wall of member 10 while part 27a of tongue 26a will clamp prong 25 against the wall of member 11. This will also insure electrical contact between members 21, 21a so that with the members assembled as seen in FIGURES 1 and 6, bulb 15 will light when ball 34 is positioned as seen in FIGURE 3. This permits the device to be used as a flashlight. Obviously, when the device is to be carried, ball 34 will be positioned as shown in FIGURE 4 so as to interrupt the device's electrical circuit and prevent unnecessary drain on the batteries.

The embodiment shown in FIGURES 11, 12 and 13 differs from that heretofore described in that but a single member is provided for containing the batteries, the bulb and the like. In this embodiment, there is provided an elongated tubular metallic housing 37 which is open at one end and closed at the other end to provide a socket in which is seated a ball-like switch member 39 which is similar in all respects to the hereinabove described ball member 34. A slot 39, similar to slot 33, is formed in housing 37 to pass the boss 40 which projects from the ball.

Disposed within housing 37 are a pair of batteries 41, 42 and closing the open end of the housing is a cap member 43 having a central aperture 44 in which seats the end of a bulb 45. Cap member 43 has a portion which frictionally engages about the base 46 of the bulb to maintain the latter centered within the housing and the cap member is provided with threads 47 which engage with inwardly depressed portions 48 of member 37 (see FIGURE 13) to provide for threading the cap member in place within the housing. Interposed between the bulb and the adjoining battery 41 is a spring 49 carried by an insulated, centralizing disc member 50. Disc member 50 has a metallic insert 51 thereby establishing a circuit between the central terminal of battery 41 and the central contact of the bulb.

Referring to FIGURE 11, a flexible lead 52 extends from ball 38 and as herein shown, carries an alligator-type clamp 53 at its free end. Slidably carried by housing 37 is a clip 54 by means of which the device may be secured to a pocket and carried by this clip and extending axially of the housing is a prong 55.

To utilize the device shown in FIGURES 11 and 12 as a circuit tester, clip 53 will be engaged with one part of the circuit to be tested while housing 37 will be engaged with another part of the circuit. If desired, clip 54 may be slid toward the open end of the housing so that prong 55 projects axially thereof whereupon the prong may be employed to engage the circuit to be tested. When the device is to be used as a flashlight, clip 53 will be engaged with clip 54 to thereby form a complete circuit. As will be understood, ball 38 functions as a switch in the same manner as the previously described ball 34.

The embodiment fragmentarily shown in FIGURE 14 is similar to that shown in FIGURES 11 and 12 with the exception that ball 38 and its attached lead 52 have been replaced by a ball 56 having an abutment 57. Ball 56 differs from ball 38 in that it is formed of conductive material with the exception of a small insert 58 of plastic or other dielectric material. This arrangement provides a pocket flashlight having a simple, low-cost trouble-free switch. As will be evident, with ball 56 disposed in the full line position shown, the device's electrical circuit will be broken and the bulb will not be lit. When, however, the ball is shifted to its dotted line position, the device's circuit will be completed and the bulb will light.

Although not shown, it is to be understood that ball 55, 56, and indeed balls 38 and 34, may not be perfectly spherical but may be flattened at certain places so that they will be resiliently held in their respective operating and/or non-operating positions.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. An electrical device comprising a pair of cylindrical members each having an axially extending recess and the recess of one terminating in a socket adjacent the end of the member in which it is formed, a current carrying axially projecting probe carried by each of said members and the latter being adapted to be assembled together in end to end abutting relation with the respective probe of each member disposed within the opposite member and with said probes in electrical engagement with each other, battery means disposed within respective recesses provided by respective members, bulb means carried by one of said members, means providing an electrical circuit which includes said battery means, said bulb means and said probes and which also includes a flexible lead exteriorly connecting said members together, one of said probes, upon disassembly of said members, being adapted to engage a portion of an electrical circuit whose continuity is to be tested and the other probe being adapted to engage another portion of the circuit to be tested whereupon lighting of said bulb means will give visual indication that the circuit being tested is complete, and switch means interposed in said device circuit for selectively interrupting the latter when said members are in assembled relation to prevent drain on said battery means when the device is not in use and for selectively completing said device circuit when said members are in assembled relation to thereby provide for use of said device as a flashlight, said switch means comprising a generally ball-like body seated within said socket and from which said flexible lead projects and having a current conducting portion electrically connected with said lead and also having a dielectric portion, said body being shiftable within said socket to selectively position either of said portions in said device circiut and in respective positions permitting current flow through such circuit and preventing current flow therethrough.

2. A combined circuit tester and flashlight, comprising a pair of hollow members each having a current-conducting probe projecting from one end and also having current-conducting socket means at this end to frictionally receive the probe of the other member so that said members may be removably connected in end-to-end relation with the probe of one member mechanically and electrically engaged within the socket means of the other, an electric light bulb carried in the end of said one member opposite its probe, an electric switch carried in the end of said other member opposite its probe, a flexible conductor between said bulb and one of the contacts of said switch, battery means within at least one of said hollow members and electrically connected between said light bulb and said switch through an electrical circuit established by seating of said current-conducting probes into respective socket means to thereby place energization of said bulb under control of said switch, said hollow members in disconnected relation enabling the respective probes to engage spaced parts of an electrical circuit to be tested and in such disconnected relation said battery means being placed in circuit with said bulb and switch through a continuous circuit under test.

3. The construction according to claim 2 wherein a battery is carried in each of said hollow members, the battery in said one member extending in series relation between said light bulb and its related probe and the battery in said other member extending in series relation between said switch and its related probe.

4. A combined circuit continuity tester and flashlight, comprising a pair of hollow members each having a current-conducting probe projecting from one end and also having current-conducting socket means at this end to frictionally receive the probe of the other member so that said members may be removably connected in end-to-end relation with the probe of one member mechanically and electrically engaged within the socket means of the other member, an electric light bulb carried by said one member and electrically connected to its probe, and battery means disposed in series circuit with said probes and said light bulb by selectively seating said probes into respective sockets means to provide a flashlight, and by electrically engaging said probes with spaced parts of a continuous circuit under test.

5. The construction according to claim 4 and further including an electric switch for controlling flow of current from said battery means to said light bulb.

References Cited in the file of this patent
UNITED STATES PATENTS

| | | |
|---|---|---|
| 1,852,190 | Roe | Apr. 5, 1932 |
| 2,479,186 | Simkins | Aug. 16, 1949 |
| 2,530,505 | Brill | Nov. 21, 1950 |
| 2,763,834 | MacDonald et al. | Sept. 18, 1956 |
| 2,778,992 | McFarland | Jan. 22, 1957 |
| 2,846,644 | Costello | Aug. 5, 1958 |
| 2,852,661 | Garland | Sept. 16, 1958 |